United States Patent
Wakoh et al.

(10) Patent No.: US 9,127,327 B2
(45) Date of Patent: Sep. 8, 2015

(54) ENVIRONMENTALLY FRIENDLY FLUX FOR MOLTEN STEEL DESULFURIZATION

(75) Inventors: Masamitsu Wakoh, Tokyo (JP); Akihiro Matsuzawa, Tokyo (JP); Katsuhiro Fuchigami, Tokyo (JP); Kohsuke Kume, Tokyo (JP); Yuji Ogawa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 1 day.

(21) Appl. No.: 14/002,170

(22) PCT Filed: Mar. 30, 2012

(86) PCT No.: PCT/JP2012/058619
§ 371 (c)(1),
(2), (4) Date: Aug. 29, 2013

(87) PCT Pub. No.: WO2012/133795
PCT Pub. Date: Oct. 4, 2012

(65) Prior Publication Data
US 2013/0333518 A1    Dec. 19, 2013

(30) Foreign Application Priority Data
Mar. 31, 2011 (JP) ................. 2011-079113

(51) Int. Cl.
*C21C 7/064* (2006.01)
*C21C 1/02* (2006.01)
*C21C 7/076* (2006.01)

(52) U.S. Cl.
CPC ............. *C21C 7/064* (2013.01); *C21C 7/0645* (2013.01); *C21C 7/076* (2013.01); *C21C 1/025* (2013.01)

(58) Field of Classification Search
CPC ...... C21C 7/0645; C21C 7/064; C21C 7/076; C21C 1/025
USPC ........................................... 75/329, 570
See application file for complete search history.

(56) References Cited

U.S. PATENT DOCUMENTS 3,915,696 A * 10/1975 Fink .............................. 75/323
4,435,210 A * 3/1984 Hirokawa et al. ............. 75/315

(Continued)

FOREIGN PATENT DOCUMENTS

| CN | 1290199 A | 4/2001 |
| CN | 101760585 A | 6/2010 |

(Continued)

OTHER PUBLICATIONS

Machine translation of DE 19747896 A1 published May 1998.*

(Continued)

*Primary Examiner* — George Wyszomierski
*Assistant Examiner* — Tima M McGuthry Banks
(74) *Attorney, Agent, or Firm* — Kenyon & Kenyon LLP (57) ABSTRACT

An environmentally friendly flux for molten steel desulfurization includes CaO and $Al_2O_3$ so that $[CaO]/[Al_2O_3]$ is within a range of 1.6 to 3.0, and includes one or more alkali metal oxides of $Na_2O$, $K_2O$, and $Li_2O$, and $SiO_2$ so that $[SiO_2]/[R_2O]$ is within a range of 0.1 to 3, $[R_2O]$ is within a range of 0.5 mass % to 5 mass %, and $[SiO_2]$ is within a range of 0.05 mass % to 15 mass % in a case in which the [CaO], the $[Al_2O_3]$, the $[SiO_2]$, and the $[R_2O]$ represent the mass % of CaO, the mass % of $Al_2O_3$, the mass % of $SiO_2$, and the total amount of the mass % of $Na_2O$, the mass % of $K_2O$, and the mass % of $Li_2O$ respectively.

9 Claims, 2 Drawing Sheets (56) References Cited

U.S. PATENT DOCUMENTS

| | | | | |
|---|---|---|---|---|
| 6,179,895 B1 * | 1/2001 | Barker | ............................ | 75/323 |
| 2005/0066772 A1 | 3/2005 | Flores-Morales et al. | | |
| 2011/0005705 A1 | 1/2011 | Hanao et al. | | |

FOREIGN PATENT DOCUMENTS

| CN | 101775465 A | 7/2010 | | |
|---|---|---|---|---|
| DE | 1959173 | 6/1971 | | |
| DE | 19747896 A1 * | 5/1998 | ................ | C03C 6/10 |
| JP | B-48-34973 | 10/1973 | | |
| JP | A-53-065212 | 6/1978 | | |
| JP | 03-264624 | 11/1991 | | |
| JP | 06-235011 | 8/1994 | | |
| JP | 08-209212 | 8/1996 | | |
| JP | 2000-226284 | 8/2000 | | |
| JP | 2001-335819 | 12/2001 | | |
| JP | 2001-335820 | 12/2001 | | |
| JP | 2002-060832 | 2/2002 | | |
| JP | 2002-241823 | 8/2002 | | |
| JP | 2002-285217 | 10/2002 | | |
| JP | 2003-253315 | 9/2003 | | |
| JP | 2011-236456 | 11/2011 | | |
| JP | 2012-001779 | 1/2012 | | |
| WO | 2008/081763 | 7/2008 | | |

OTHER PUBLICATIONS

Chinese Office Action dated Mar. 31, 2014 issued in corresponding Chinese Application No. 201280014167.2.
International Search Report dated Jun. 26, 2012 issued in corresponding PCT Application No. PCT/JP2012/058619.
"The Effects of Adding Alkali Oxides on the Desulfurization Capability of a Secondary Refining Flux" Kyushu University, Graduate School of Engineering, Eisuke Takada, et al., Proc. MMIJ Spring Meeting, Kyushu, 2009, pp. 76-78. (Partial Translation).
European Search Report dated Sep. 17, 2014 issued in related European Application No. 12765532.2.

* cited by examiner

ENVIRONMENTALLY FRIENDLY FLUX FOR MOLTEN STEEL DESULFURIZATION

FIELD OF THE INVENTION

The present invention relates to a flux used during refining of highly clean steel. The invention particularly relates to a flux that is used to perform desulfurization in a secondary refining process after a converter process or in a refining process inside or outside an electric furnace during steel making. Here, the flux is a collective term of various compounds which react with molten iron so as to have a function of removing impurities.

This application is a national stage application of International Application No. PCT/JP2012/058619, filed Mar. 30, 2012, which claims priority to Japanese Patent Application No. 2011-79113, filed Mar. 31, 2011, the content of which is incorporated herein by reference.

DESCRIPTION OF RELATED ART

For high-tensile steel having favorable formability, high-strength line pipes, high-strength steel plates, and the like, there is a demand for an extreme decrease in the amount of S which is an impurity of steel. Therefore, desulfurization of molten steel is performed in a secondary refining process after a converter process or in a reduction stage of an electric furnace process during steel making. For desulfurization of molten steel, a CaO-based desulfurization flux is mainly used, and there are frequent cases in which a flux including $CaF_2$ having a high desulfurization ability is used to decrease the S content within a short period of time.

However, since the desulfurization flux including $CaF_2$ is highly reactive, and easily erodes away refractories in a refining reactor, there is a problem in that the service life of the refractories is shortened. In addition, slag discharged after refining is generally used for roadbed materials and the like; however, when a large amount of $CaF_2$ is present in slag which is formed during desulfurization using a flux including $CaF_2$, there is a concern that F eluted from $CaF_2$ may have an adverse influence on the environment. Therefore, in this case, it is necessary to perform stricter management of slag components or further limit the use of slag.

As a molten steel desulfurization flux which does not include $CaF_2$, but has a high desulfurization ability, for example, Patent Citation 1 discloses a desulfurization flux including $Na_2O$. However, Patent Citation 1 does not disclose the $Na_2O$ content (mass %) in the desulfurization flux.

Patent Citation 2 discloses a desulfurization flux including $K_2O$. Patent Citation 3 discloses a desulfurization flux including $Na_2O$ or $K_2O$. However, those desulfurization fluxes are for hot metal desulfurization. In addition, the $Na_2O$ and $K_2O$ contents in the desulfurization flux are 15 mass % or more. Thus, when large amounts of $Na_2O$ and $K_2O$ are present in the desulfurization flux, there is a problem in that $Na_2O$ and $K_2O$ evaporate during a desulfurization treatment. In addition, there is a concern that large amounts of $Na_2O$ and $K_2O$ may be present in slag after desulfurization treatment.

Patent Citation 4 discloses a method in which a desulfurizing agent containing $Na_2CO_3$ is used. However, the desulfurizing agent is a flux for hot metal desulfurization, and, in Patent Citation 4, since the $Na_2CO_3$ content is high, there is a problem in that $Na_2O$ evaporates or remains in slag.

Patent Citations 5 to 8 disclose methods in which $Na_2O$ is used, but all the methods are targeted at hot metal desulfurization. In the hot metal desulfurization, the treatment temperature or the C and O contents in hot metal are significantly different from those in molten steel desulfurization. Therefore, when the methods of Patent Citations 5 to 8 are applied to molten steel desulfurization with no change, there is a concern that the problem of evaporation of $Na_2O$ may become significant, or a large amount of $Na_2O$ may remain in slag after desulfurization treatment.

As described above, for high-tensile steel having favorable workability, high-strength line pipes, high-strength steel plates, and the like, there is a demand for a decrease in S which is an impurity of steel as much as possible, and desulfurization of molten steel is performed in a secondary refining process (a refining process after a converter process or an electric furnace process) during steel making. At this time, there are frequent cases in which a flux including $CaF_2$ having a high desulfurization ability is used to decrease S within a short period of time.

However, as described above, since the desulfurization flux including $CaF_2$ is highly reactive, there is a problem in that refractories in a refining reactor are easily melted away, and the service life of the refractories is shortened. In addition, slag discharged after refining is generally used for roadbed materials and the like; however, since slag includes $CaF_2$ when a desulfurization flux including $CaF_2$ is used for desulfurization, and there is a problem of elution of F, and therefore the use of slag is significantly limited.

Therefore, with regard to hot metal desulfurization, a number of techniques in which a desulfurization flux including $Na_2O$ or $K_2O$ instead of $CaF_2$ is used are proposed. However, as described above, since the conditions of hot metal desulfurization are significantly different from the conditions of molten steel desulfurization, it is not possible to apply the hot metal desulfurization techniques to molten steel desulfurization with no change.

In a case where the $Na_2O$ content (mass %) or the $K_2O$ content (mass %) is high, there is a concern that a problem may occur in which easily evaporating $Na_2O$ or $K_2O$ attaches to the exhaust duct in a secondary refining facility, or the $Na_2O$ or $K_2O$ content in slag becomes high after desulfurization such that recycled slag has an adverse influence on the environment.

PATENT CITATION

[Patent Citation 1] Japanese Unexamined Patent Application, First Publication No. H03-264624
[Patent Citation 2] Japanese Unexamined Patent Application, First Publication No. 2000-226284
[Patent Citation 3] Japanese Unexamined Patent Application, First Publication No. H06-235011
[Patent Citation 4] Japanese Unexamined Patent Application, First Publication No. 2002-241823
[Patent Citation 5] Japanese Unexamined Patent Application, First Publication No. H08-209212
[Patent Citation 6] Japanese Unexamined Patent Application, First Publication No. 2001-335819
[Patent Citation 7] Japanese Unexamined Patent Application, First Publication No. 2001-335820
[Patent Citation 8] Japanese Unexamined Patent Application, First Publication No. 2003-253315

SUMMARY OF THE INVENTION

Problems to be Solved by the Invention

Therefore, the present invention has been made in consideration of the above problems, and an objective of the present invention is to provide an environmentally friendly desulfurization flux for molten steel desulfurization which has a high desulfurization ability even when not including $CaF_2$.

Methods for Solving the Problem

The present invention has been made to solve the above problems, and the purports thereof are as follows.

(1) An environmentally friendly flux for molten steel desulfurization according to an aspect of the present invention includes CaO and $Al_2O_3$ so that $[CaO]/[Al_2O_3]$ is within a range of 1.6 to 3.0, and includes one or more alkali metal oxides of $Na_2O$, $K_2O$, and $Li_2O$, and $SiO_2$ so that $[SiO_2]/[R_2O]$ is within a range of 0.1 to 3, $[R_2O]$ is within a range of 0.5 mass % to 5 mass %, and $[SiO_2]$ is within a range of 0.05 mass % to 15 mass % in a case in which the [CaO], the $[Al_2O_3]$, the $[SiO_2]$, and the $[R_2O]$ represent the mass % of CaO, the mass % of $Al_2O_3$, the mass % of $SiO_2$, and the total amount of the mass % of $Na_2O$, the mass % of $K_2O$, and the mass % of $Li_2O$ respectively.

(2) The environmentally friendly flux for molten steel desulfurization according to the above (1) may further include 1 mass % to 10 mass % of MgO.

(3) In the environmentally friendly flux for molten steel desulfurization according to the above (1) or (2), the $[SiO_2]$ may be 0.05 mass % to 9.3 mass %.

(4) In the environmentally friendly flux for molten steel desulfurization according to any one of the above (1) to (3), the $[SiO_2]$ may be 0.05 mass % to 8.0 mass %.

(5) In the environmentally friendly flux for molten steel desulfurization according to any one of the above (1) to (4), the $[SiO_2]/[R_2O]$ may be 0.1 to 2.

(6) In the environmentally friendly flux for molten steel desulfurization according to any one of the above (1) to (5), some or all of the alkali metal oxides may have a chemical bond with the $SiO_2$.

(7) In the environmentally friendly flux for molten steel desulfurization according to any one of the above (1) to (6), the alkali metal oxides may be $Na_2O$.

(8) In a molten steel desulfurization method according to an aspect of the present invention, the environmentally friendly flux for molten steel desulfurization according to any one of the above (1) to (9) is supplied to molten steel.

(9) In a molten steel desulfurization method according to an aspect of the present invention, slag including one or more of $Na_2O$, $K_2O$, and $Li_2O$, as well as CaO, $Al_2O_3$, and $SiO_2$ is formed on the surface of molten steel so that $[CaO]/[Al_2O_3]$ is within a range of 1.6 to 3.0, $[SiO_2]/[R_2O]$ is within a range of 0.1 to 3, $[R_2O]$ is within a range of 0.5 mass % to 5 mass %, and $[SiO_2]$ is within a range of 0.05 mass % to 15 mass % in a case in which the [CaO], the $[Al_2O_3]$, the $[SiO_2]$, and the $[R_2O]$ represent the mass % of CaO, the mass % of $Al_2O_3$, the mass % of $SiO_2$, and the total amount of the mass % of $Na_2O$, the mass % of $K_2O$, and the mass % of $Li_2O$ respectively.

Effects of the Invention

According to the aspects of the present invention, it is possible to manufacture high-grade steel having an extremely small amount of S without the occurrence of problems of elution of F from slag after desulfurization, attachment of $Na_2O$ or $K_2O$ to a facility due to evaporation, a decrease in productivity due to a decrease in desulfurization efficiency, an increase in desulfurization costs, and the adverse influence of slag including a large amount of $Na_2O$ or $K_2O$ after desulfurization on the environment.

DETAILED DESCRIPTION OF THE INVENTION

Hereinafter, [CaO], $[Al_2O_3]$, $[SiO_2]$, [MgO], and $[R_2O]$ represent the mass % of CaO, the mass % of $Al_2O_3$, the mass % of $SiO_2$, the mass % of MgO, and the mass % of $R_2O$. Meanwhile, hereinafter, there are cases in which the amounts (mass %) of the various components are represented by [chemical formula of component]. In addition, in a case in which a compound from which a metallic oxide such as CaO (including complex oxides thereof) is obtained through thermal decomposition is included, the mass percentage of a metal oxide in the compound is evaluated using the mass of the thermally decomposed compound, and byproducts such as $CO_2$ or $H_2O$ which are generated due to thermal decomposition are not included in the mass percentage of a flux. Herein, the $R_2O$ corresponds to $Na_2O$, $K_2O$, and $Li_2O$, and the $[R_2O]$ represents the total amount of $Na_2O$, $K_2O$, and $Li_2O$. Among $Na_2O$, $K_2O$, and $Li_2O$, the amount of components not included in a flux is evaluated to be zero.

The inventors firstly studied use of oxides of alkali metals such as $Na_2O$, $K_2O$, and $Li_2O$ instead of $CaF_2$. As described above, a flux including $Na_2O$ or $K_2O$ has a high desulfurization ability. In addition, $Li_2O$ is also an oxide of an alkali metal, similarly to the case of $Na_2O$ or $K_2O$, $Li_2O$ is expected to have a high desulfurization ability.

However, as described above, the oxides ($R_2O$) of the alkali metals such as $Na_2O$, $K_2O$, and $Li_2O$ have a characteristics of being easily evaporated at a high temperature. Since ease of evaporation is dependent on $[R_2O]$, the amount of $R_2O$ in a flux is preferably as small as possible, but the desulfurization ability of a flux enhances as $[R_2O]$ increases.

Therefore, in a case in which $R_2O$ is added to a desulfurization flux in order to enhance the desulfurization ability, to what extent the amount of $[R_2O]$ in the desulfurization flux can be decreased while a desulfurization ability necessary for a desulfurization flux is secured becomes a key to the solution to the problems. In order to suppress $[R_2O]$ to a low level while a desulfurization ability is secured, the composition of main components that compose a flux is important.

The inventors used a $CaO$—$Al_2O_3$-based desulfurization flux which is generally used as a base component in a desulfurization flux, and investigated the desulfurization ability by changing $[Na_2O]$, $[K_2O]$, and $[Li_2O]$ in the desulfurization flux through laboratory scale experiments.

The chemical compositions of molten steel used in the experiments are shown in Table 1.

TABLE 1

| | | | | | | | (mass %) |
|---|---|---|---|---|---|---|---|
| C | Si | Mn | P | S | Al | N | O |
| 0.05 | 0.2 | 1.0 | 0.005 | 0.004 | 0.03 | 0.03 | 0.0015 |

The experimental conditions are as follows.

Melting furnace: resistance melting furnace, amount of molten steel: 10 kg, temperature of molten steel: 1600° C.

Experimental procedure: melting-composition adjustment-Al deoxidization-desulfurization-cooling Desulfurization method: a desulfurization flux is injected into the molten steel using a refractory pipe.

Desulfurization flux composition:

$[CaO]/[Al_2O_3]=2.0$ $Na_2O$, $K_2O$, or $Li_2O$: 0 mass % to 10 mass %

Figure 1:
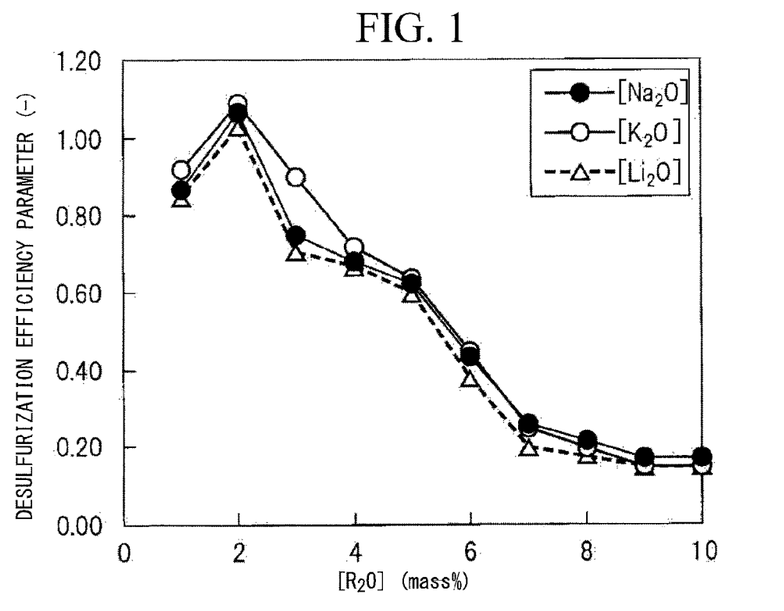
FIG. 1 is a view showing the relationship between the desulfurization efficiency parameter and the amount (mass %) of $R_2O$ (one or more of $Na_2O$, $K_2O$, and $Li_2O$).

The experimental results are shown in FIG. 1. The desulfurization efficiency parameter (the vertical axes in FIGS. 1 and 2) and the desulfurization rate constant (the vertical axis in FIG. 3) are defined as follows.

Desulfurization efficiency parameter=(desulfurization rate constant)/(amount of $R_2O$ evaporated)

Desulfurization rate constant=−ln(final [S]/initial [S])/time, time=15 minutes

Amount evaporated: (initial [$R_2O$]−final [$R_2O$])/(initial [$R_2O$])

Since desulfurization is performed within as short a time as possible in the industrial process from the viewpoint of productivity improvement, in the experiments, values at 15 minutes after the initiation of desulfurization were used as the desulfurization rate constant. It is found from FIG. 1 that, in the case of $Na_2O$, the desulfurization efficiency parameter becomes the maximum at an initial content of "2 mass %." Similarly, in the case of $K_2O$ or $Li_2O$, the desulfurization efficiency parameter becomes the maximum at an initial content of "2 mass %."

As such, a high desulfurization efficiency parameter means that "the amount of $R_2O$ evaporated is small, and the desulfurization rate constant is large", that is, a desulfurization reaction proceeds favorably. From this fact, it can be said that it is not necessary to add a large amount of $R_2O$ ($Na_2O$, $K_2O$, and/or $Li_2O$) to a desulfurization flux in order to supply a high desulfurization ability. That is, even when [$R_2O$] is simply increased, the amount evaporated increases, and the majority of $R_2O$ is simply wasted.

Actually, in a case in which a large amount of a desulfurization flux is produced, it is difficult to control the $R_2O$ content to be 2 mass % because of content fluctuation. However, the factor that significantly influences desulfurization reaction or evaporation is not the component content, but the component activity, that is, the lability in consideration of the influence of coexisting components. From this fact, the inventors obtained an idea of controlling the activity of components that compose a desulfurization flux.

Since $SiO_2$ is firstly considered as a component that has a large influence on the activity of $Na_2O$, $K_2O$, or $Li_2O$, the inventors investigated the influence of [$SiO_2$] on the activity of $Na_2O$ through similar laboratory scale desulfurization experiments. The chemical compositions of molten steel used in the experiments are shown in Table 1, and the experimental conditions are as follows.

Melting furnace: resistance melting furnace, amount of molten steel: 10 kg, temperature of molten steel: 1600° C.

Experimental procedure: melting-composition adjustment-Al deoxidization-desulfurization-cooling Desulfurization method: a desulfurization flux is injected into the molten steel using a refractory pipe.

Desulfurization flux composition:

$[CaO]/[Al_2O_3]=2.0$ $[SiO_2]/[Na_2O]=0$ to 5

$Na_2O$: 0 mass % to 10 mass %

Figure 2:
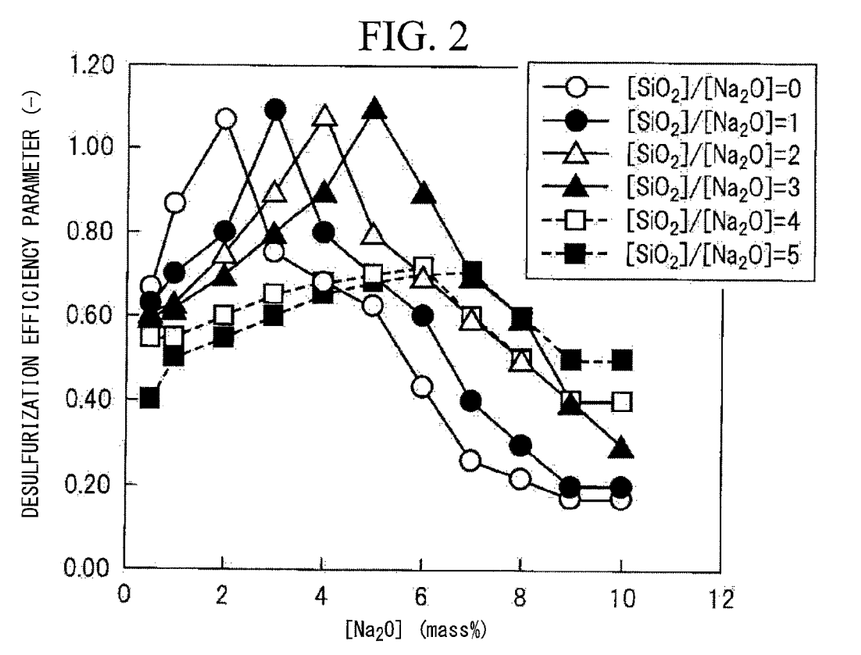
FIG. 2 is a view showing the relationship between the desulfurization efficiency parameter and the $Na_2O$ content (mass %) with respect to a variety of $[SiO_2]/[Na_2O]$s.

The experimental results are shown in FIG. 2. The vertical axis in FIG. 2 indicates the desulfurization efficiency parameter similarly to the vertical axis in FIG. 1. It is found from FIG. 2 that [$Na_2O$] at which the desulfurization efficiency parameter becomes the maximum increases as [$SiO_2$]/[$Na_2O$], which is a mass % ratio, increases.

[$Na_2O$] at which [$SiO_2$]/[$Na_2O$]=3, and the desulfurization efficiency parameter becomes the maximum is 5 mass %. When [$SiO_2$] is increased with the above [$SiO_2$]/[$Na_2O$] as a criterion, the [$Na_2O$] at which the desulfurization efficiency parameter becomes the maximum also increases. However, when [$Na_2O$] increased to more than the criterion, the manufacturing costs of a desulfurization flux increases, and, furthermore, [$Na_2O$] in slag also increases after desulfurization.

Generally, when [$Na_2O$] in slag exceeds 2 mass % after desulfurization, the slag becomes inappropriate for civil engineering aggregate or cement aggregate. Therefore, the inventors separately analyzed the relationship between [$Na_2O$] in slag after desulfurization and [$Na_2O$] in a desulfurization flux, and obtained the maximum acceptable amount of [$Na_2O$] in the desulfurization flux. As a result of the analysis, it was found that the maximum acceptable amount of [$Na_2O$] is approximately 5 mass %. Therefore, [$Na_2O$] in a desulfurization flux is preferably 5 mass % or less. Similarly, [$K_2O$] and [$Li_2O$] in a desulfurization flux are also preferably 5 mass % or less. It is preferable that the [$Na_2O$], [$K_2O$], and [$Li_2O$] are as small as possible.

The inventors further investigated [CaO]/[$Al_2O_3$] regarding CaO and $Al_2O_3$ which were main components of a desulfurization flux. Desulfurization experiments were performed by making the desulfurization flux contain 2.5 mass % of $Na_2O$ and 5 mass % of $SiO_2$ as other components, and changing [CaO]/[$Al_2O_3$]. The chemical compositions of molten steel used for the experiments are shown in Table 1, and the experimental conditions are as follows.

Melting furnace: resistance melting furnace, amount of molten steel: 10 kg, temperature of molten steel: 1600° C.

Experimental procedure: melting-composition adjustment-Al deoxidization-desulfurization-cooling Desulfurization method: a desulfurization flux is injected into the molten steel using a refractory pipe.

Desulfurization flux composition:

$[CaO]/[Al_2O_3]=1.0$ to 4.0

$SiO_2$: 5 mass %; $Na_2O$: 2.5 mass %

Figure 3:
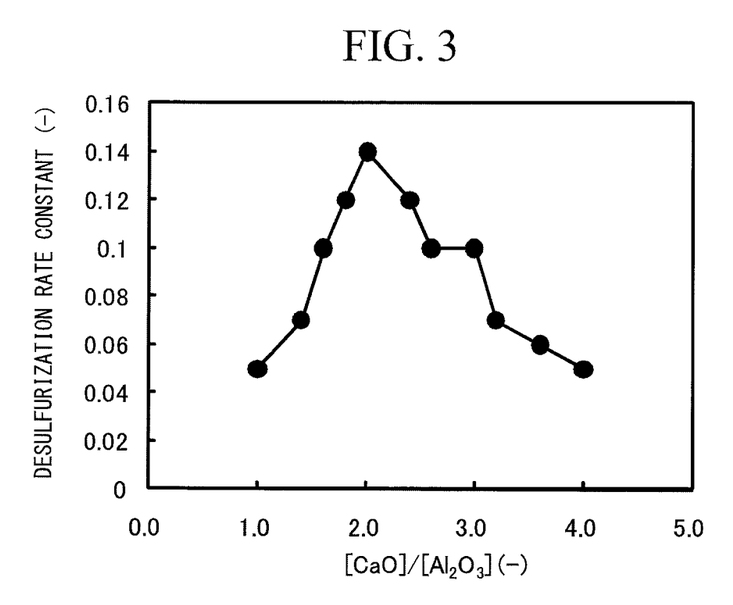
FIG. 3 is a view showing the relationship between the desulfurization rate constant and $[CaO]/[Al_2O_3]$.

The experimental results are shown in FIG. 3. The vertical axis in FIG. 3 indicates the desulfurization rate constant. It is found from FIG. 3 that the desulfurization rate constant becomes a high value of 0.10 or more in a range of [CaO]/[$Al_2O_3$]=1.6 to 3.0.

For desulfurization of molten steel, CaO-based fluxes are generally used, and, among them, a CaO—$Al_2O_3$-based flux is frequently used. In a case in which the CaO—$Al_2O_3$-based flux is used, the composition region appropriate for desulfurization is generally a region of [CaO]/[$Al_2O_3$] of 1.0 to 2.33 in a CaO—$Al_2O_3$ binary phase diagram.

This region is a region in which a liquid phase is present in a flux at the desulfurization temperature (approximately 1600° C.) of molten steel, and some solid-phase CaO is generated. When the flux is in a liquid phase, desulfurization rapidly proceeds, and, when solid-phase CaO is present in the liquid phase even at a small amount, the activity of CaO in the liquid phase becomes 1, and a desulfurization reaction can easily proceed.

However, in a case in which $Na_2O$ and $SiO_2$ are present in a desulfurization flux, there is a possibility of a change in the desulfurization ability due to the composition conditions. Therefore, the inventors found from the results shown in FIG. 3 obtained through the molten steel desulfurization experiments that the optimal $[CaO]/[Al_2O_3]$ for desulfurization was 1.6 to 3.0.

Similarly to $SiO_2$, $Al_2O_3$ is also an oxide having an influence on the reactivity of $R_2O$, and, when $Al_2O_3$ is excessively present in a desulfurization flux, the reactivity of $R_2O$ degrades. This fact is also reflected in the desulfurization experimental results shown in FIG. 3.

Hereinafter, a molten steel desulfurization flux according to an aspect of the present invention will be described. Except in a case in which $CaF_2$ is inevitably included in the starting materials of a flux, the molten steel desulfurization flux according to the embodiment basically does not include $CaF_2$. Even in a case in which $CaF_2$ is inevitably included, $CaF_2$ may be limited to 1 mass % or less and preferably 0.1 mass % or less in terms of outer percentage.

The environmentally friendly flux for molten steel desulfurization according to the embodiment (hereinafter sometimes referred to as the "present flux") substantially does not include $CaF_2$, (i) includes CaO and $Al_2O_3$ as main components so that $[CaO]/[Al_2O_3]$ becomes within a range of 1.6 to 3.0, (ii) includes 0.5 mass % to 5 mass % of one or more of $Na_2O$, $K_2O$, and $Li_2O$ ($R_2O$), and 0.05 mass % to 15 mass % of $SiO_2$ so that $[SiO_2]/[R_2O]$ becomes within a range of 0.1 to 3, and, furthermore, includes 10 mass % or less of MgO according to necessity.

In the present flux, the reason why $[CaO]/[Al_2O_3]$ is set to 1.6 to 3.0 is to secure a sufficient desulfurization rate as described above. In order to obtain a higher desulfurization rate, $[CaO]/[Al_2O_3]$ is preferably 1.6 to 2.8.

In the present flux, the reason why $[R_2O]$ is set to 0.5 mass % to 5 mass % is as follows.

Based on the experimental results shown in FIGS. 1 and 2, the minimum $Na_2O$ content (mass %) at which the effect of addition of $Na_2O$ sufficiently develops is set to 0.5 mass % at which the desulfurization efficiency parameter exceeds 0.60. The maximum content of 5 mass % is a threshold limit value in order to prevent $[Na_2O]$ in slag from exceeding 2 mass % after desulfurization in consideration of the amount of $Na_2O$ reduced during a desulfurization treatment.

Since the effects of $K_2O$, or $Li_2O$ are the same as the effects of $Na_2O$, similarly to $Na_2O$, $[K_2O]$ was set to 0.5 mass % to 5 mass %, and $[Li_2O]$ was set to 0.5 mass % to 5 mass %.

Since the effects of $K_2O$, $Li_2O$, and $Na_2O$ are the same, two or more of $Na_2O$, $K_2O$, and $Li_2O$ may be additively used. The combinations are $Na_2O+K_2O$, $Na_2O+Li_2O$, $K_2O+Li_2O$, and $Na_2O+K_2O+Li_2O$. In conclusion, the total of the amounts of one or more of $Na_2O$, $K_2O$, and $Li_2O$, that is, $[R_2O]$ is set to 0.5 mass % to 5 mass %.

$Na_2O$, $K_2O$, and $Li_2O$ are expensive, and there are cases in which $Na_2O$, $K_2O$, and $Li_2O$ evaporate so as to attach to and deposit on a facility, or melt away refractories in a refining reactor. Particularly, the amount of $R_2O$ in slag is preferably as small as possible after desulfurization treatment from the viewpoint of the recycling of the slag. Therefore, the $R_2O$ content ($[R_2O]$) in a desulfurization flux is preferably as small as possible. From such a viewpoint, the upper limit of $[R_2O]$ is preferably 3 mass % or less. In addition, in a case in which the effect of $R_2O$ is obtained more sufficiently, $[R_2O]$ is preferably 1 mass % or more.

In the present flux, the reason why $[SiO_2]/[R_2O]$ is set to 0.1 to 3 is as follows.

As shown in FIG. 2, in a case in which $[SiO_2]$ (that is, herein, $[SiO_2]/Na_2O_1$) is zero, the $Na_2O$ content at which the desulfurization efficiency parameter becomes maximum is 2 mass %. Therefore, even when $[SiO_2]$ is zero, the effect (improvement of the desulfurization ability) of $Na_2O$ develops. However, in order to stabilize $Na_2O$ and suppress evaporation as much as possible, $SiO_2$ is preferably present in the flux even at a small amount. Therefore, the lower limit of $[SiO_2]/[Na_2O]$ was set to 0.1.

The upper limit of $[SiO_2]/[Na_2O]$ of 3 is a condition under which the maximum value of the desulfurization efficiency parameter shown in FIG. 2 is obtained at the maximum acceptable value of $[Na_2O]$ of 5 mass %. In this case, the desulfurization efficiency parameter exceeds 0.6 throughout the entire range in which $[Na_2O]$ is 0.5 mass % to 5 mass %. Definitely, in FIG. 2, even when $[SiO_2]/[Na_2O]$ is 4 or more, there is a range of $[Na_2O]$ in which the desulfurization efficiency parameter exceeds 0.6, but the range is narrow. In addition, in the range, while evaporation of $Na_2O$ can be sufficiently suppressed, the desulfurization ability per the unit amount of $Na_2O$ significantly degrades, and therefore $[SiO_2]/[Na_2O]$ of 4 or more is not preferable from the viewpoint of securing the effects of $Na_2O$.

For $K_2O$ and $Li_2O$ as well, $[SiO_2]/[K_2O]$ was set to 0.1 to 3, and $[SiO_2]/[Li_2O]$ was set to 0.1 to 3 respectively for the same reason. Even a case in which two or more of $Na_2O$, $K_2O$, and $Li_2O$ are additively used in combination is the same as the above case. That is, in the present flux, $[SiO_2]/[R_2O]$ is set to 0.1 to 3. $[SiO_2]/[R_2O]$ is preferably 0.1 to 2, more preferably 0.5 to 2, and still more preferably 1 to 2.

Figure 4:
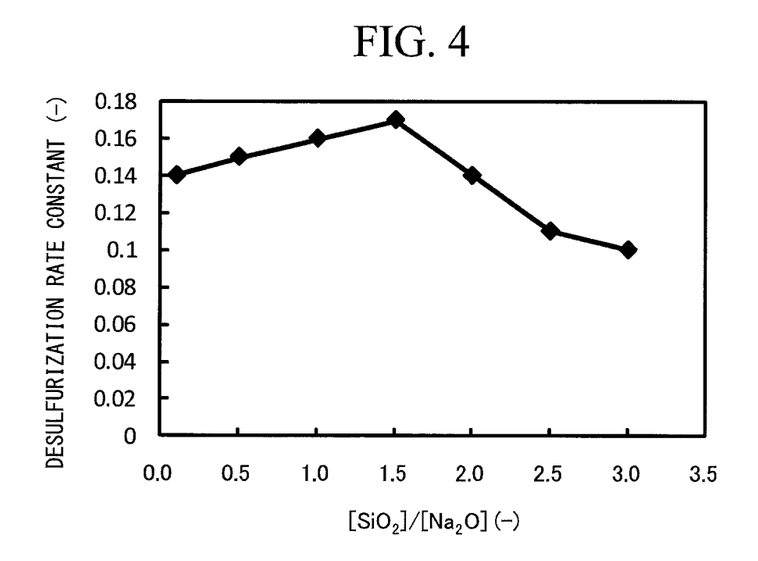
FIG. 4 is a view showing the relationship between $[SiO_2]/[Na_2O]$ and the desulfurization rate constant in a case in which $[CaO]/[Al_2O_3]$ is 2.

FIG. 4 shows the relationship between $[SiO_2]/[Na_2O]$ and the desulfurization rate constant in a case in which $[CaO]/[Al_2O_3]$ is 2. It is found from FIG. 4 that the desulfurization rate constant is maximized at $[SiO_2]/[Na_2O]$ of 1.5. In addition, when $[SiO_2]/[Na_2O]$ is 2 or less, in a case in which $[SiO_2]/[Na_2O]$ is sufficiently small (for example, 0.1), a similar desulfurization rate constant is obtained. Therefore, in a case in which a sufficient desulfurization efficiency parameter is secured, and a processing time is shortened, $[SiO_2]/[R_2O]$ may be 0.1 to 2. In this case, the intensity of the bond between $SiO_2$ and $R_2O$ can be appropriately controlled, and the desulfurization effect of $R_2O$ can be further enhanced while suppressing evaporation of $R_2O$.

From the viewpoint of the desulfurization efficiency (per the unit amount of $R_2O$), environmental protection through resource saving, and cost reduction, among $R_2O$ (alkali metal oxides), $Na_2O$ has higher performance. Therefore, $R_2O$ may be $Na_2O$. That is, in a case in which $R_2O$ is used at a high temperature and a low oxygen partial pressure or a case in which $R_2O$ is used in combination with a deoxidizing material such as Al, it is possible to suppress the loss of $R_2O$ due to evaporation using $Na_2O$ or $Li_2O$ compared to $K_2O$ since the boiling point of K is relatively low. In addition, since $Li_2O$ is a rare oxide, $Na_2O$ helps resource saving and cost reduction compared to $Li_2O$.

Furthermore, in a case in which $R_2O$ is introduced into the network of $SiO_2$ so as to further suppress the evaporation of $R_2O$, some or all of $R_2O$ may have a chemical bond with $SiO_2$. In this case, for example, 10% or more of $R_2O$ with respect to the total amount of $R_2O$ preferably has a bond with $SiO_2$. Particularly, in a case in which the evaporation suppression effect of $R_2O$ is secured using the chemical bond, the present flux may include waste material such as soda-lime glass, glass cullet, and slag including $R_2O$ or $SiO_2$. In this case, environmental protection or cost reduction through recycling and stabilization can be achieved at the same time. For example, the present flux may include a hybrid oxide in which some or all of $R_2O$ has a chemical bond with $SiO_2$, and the $[SiO_2]/[R_2O]$ of the oxide is not particularly limited, and may be 0.01 or more.

$[SiO_2]$ in the present flux is naturally determined from $[R_2O]$ (0.5 mass % to 5 mass %) and $[SiO_2]/[R_2O]$ (=0.1 to 3), and is 0.05 mass % to 15 mass %. When $[SiO_2]/[R_2O]$ increases through evaporation of $R_2O$ during a desulfurization reaction, the desulfurization efficiency is degraded. In a case in which the degradation of the desulfurization efficiency is suppressed, the $[SiO_2]$ is preferably 0.05 mass % to 9.3 mass %, and more preferably 0.05 mass % to 8.0 mass %. Here, inclusion of $SiO_2$ in the flux is important in order to suppress evaporation of $R_2O$; however, in a case in which the basicity of slag is adjusted more flexibly, $[SiO_2]$ may be limited to, for example, 0.6 mass % or 0.45 mass % or less.

In the present flux, 10 mass % or less of MgO is desirably added to the flux. The reason why the amount of MgO added is set to 10 mass % or less as an optional component is as follows.

MgO is generally a component that composes a refractory, and is added to a desulfurization flux for the purpose of suppressing the melting-away of refractories due to the desulfurization flux. In a case in which the effect of suppressing the melting away of refractories is sufficiently secured, 1 mass % or more of MgO is preferably added. However, when the amount of MgO ([MgO]) exceeds 10 mass %, the melting point of a desulfurization flux increases, and the desulfurization effect of a flux does not develop. Therefore, the amount of MgO is limited to 10 mass % or less.

The composition of the present flux is determined, for example, as follows. Firstly, the types of $R_2O$ (at least one) in the flux are determined, and $[Na_2O]$, $[K_2O]$, and $[Li_2O]$ which correspond to the types of $R_2O$ are set so as to satisfy $[R_2O]$ of 0.5 mass % to 5 mass %. Next, $[SiO_2]$ is set so as to satisfy a predetermined range of the ratio of $[SiO_2]$ to $[R_2O]$. After that, [MgO] is set according to necessity, and the total of $[R_2O]$, $[SiO_2]$, and [MgO] is subtracted from 100, thereby obtaining $[CaO]+[Al_2O_3]$.

After $[CaO]+[Al_2O_3]$ is obtained, [CaO] and $[Al_2O_3]$ are set so as to satisfy a predetermined range of $[CaO]/[Al_2O_3]$. Thereby, the amounts (mass %) of all the components of the flux are determined. Meanwhile, starting materials used to manufacture the flux (flux starting materials) contain impurities inevitably, and the impurities are inevitably introduced into the desulfurization flux, but the amounts of the inevitably contained components (inevitable impurities) are excluded from the above content calculation.

Next, a method of manufacturing the present flux will be described. A desulfurization flux is generally a mixture of oxide powder. A desulfurization flux can be used in a mixture form in which the powder is mixed; however, when the desulfurization flux is used after all or some of the oxide powder is mixed, fused or sintered, cooled, and crushed in advance, the desulfurization effect can be obtained more reliably.

In a case in which $R_2O$ is stabilized by suppressing evaporation of $R_2O$, since the above fusing or sintering accelerates the bond between $R_2O$ and $SiO_2$ or $Al_2O_3$, and contributes to the stabilization of $R_2O$, the manufacturing method preferably includes a process in which a mixture including $R_2O$ for which $[SiO_2]$ or $[Al_2O_3]$ is adjusted is fused or sintered. Particularly, the desulfurization effect is improved simply by fusing or sintering the powder mixture (mixed powder) of $R_2O$ and $SiO_2$, and then mixing in other starting materials (for example, starting materials including other components).

In soda-lime glass, glass cullet, used slag after refining, and the like, since waste material mainly including $Na_2O$ or $SiO_2$ includes $Na_2O$ and $SiO_2$, $Na_2O$ is stabilized, and the waste material is a preferable material of the present flux. In a case in which the waste material is used, $Na_2O$ or $SiO_2$ is added as necessary to the waste material or other starting materials, and the composition is adjusted so that $[SiO_2]/[Na_2O]$ becomes within a range of 0.1 to 3.

Since CaO, $Na_2O$, $K_2O$, and $Li_2O$ are often present in a carbonate form, a corresponding carbonate powder may be blended in the flux as CaO, $Na_2O$, $K_2O$, and $Li_2O$. In this case, it is necessary to estimate the mass of $CO_2$ generated during a decomposition reaction at a high temperature in advance and blend the carbonates.

For example, the present flux may include 43 mass % to 75 mass % of CaO, 17.5 mass % to 38.5 mass % of $Al_2O_3$, 0.05 mass % to 15 mass % of $SiO_2$, and 0.5 mass % to 5 mass % of $R_2O$. In addition, the present flux may include 10% or less of MgO according to necessity. For example, in a case in which the present flux does not include MgO, the present flux may include 20 mass % to 38.5 mass % of $Al_2O_3$, 0.05 mass % to 15 mass % of $SiO_2$, and 0.5 mass % to 5 mass % of $R_2O$ with the remainder composed of CaO and inevitable impurities (outer percentage). In addition, for example, in a case in which the present flux includes MgO, the present flux may include 17.5 mass % to 38.5 mass % of $Al_2O_3$, 0.05 mass % to 15 mass % of $SiO_2$, 0.5 mass % to 5 mass % of $R_2O$, and 10 mass % or less of MgO (preferably 1 mass % to 10 mass %) with the remainder composed of CaO and inevitable impurities (outer percentage). Additionally, in the present flux, as described above, $[CaO]/[Al_2O_3]$ is in a range of 1.6 to 3.0, and $[SiO_2]/[R_2O]$ is in a range of 0.1 to 3.

When molten steel desulfurization is performed using the present flux, it is possible to manufacture high-grade steel having an extremely small S content without occurrence of an environmental issue due to elution of F from slag after desulfurization, attachment of a large amount of evaporated $Na_2O$, $K_2O$, and $Li_2O$ to a facility, a decrease in productivity due to a decrease in desulfurization efficiency, and an increase in desulfurization costs.

The present flux can be used for molten steel desulfurization in a secondary refining process after a converter process, ladle refining in which an electrode heating method such as a ladle furnace (LF) is used, molten steel desulfurization in a reduction period of an electric furnace process, secondary refining after electric furnace process, and the like.

Hereinafter, molten steel desulfurization methods according to first and second embodiments of the present invention will be described. In the molten steel desulfurization method according to the first embodiment, the environmentally friendly flux for molten steel desulfurization according to the above embodiment is supplied to molten steel (into molten steel or onto the surface of molten steel).

A method of adding the desulfurization flux to molten steel (supply method) is not particularly limited. Examples of the addition method that can be used include an injection method in which the flux is blown into molten steel through a nozzle immersed in the molten steel, a method in which a lumpy flux is added to the surface of molten steel from the above, a method in which flux powder is sprayed together with gas, and the like. The desulfurization treatment time is preferably 30 minutes to 40 minutes. The specific consumption of flux is preferably 3 kg/t to 4 kg/t (per ton of molten steel). In addition, other starting materials such as calcined lime may be supplied to molten steel separate. Even in this case, since a local reaction (a decrease in the evaporation rate of $R_2O$ in the flux, acceleration of a slagging reaction between the flux and slag on the surface of the molten steel, and acceleration of a desulfurization reaction between the flux and molten steel) is important, the effect of the environmentally friendly flux for molten steel of the embodiment can be sufficiently obtained.

In the molten steel desulfurization method according to the second embodiment, a plurality of types of oxides are supplied to the surface of molten steel so that slag (including a solid-liquid mixture of slag and a flux) having the same composition as the environmentally friendly flux for molten steel desulfurization according to the above embodiment is formed.

The environmentally friendly flux for molten steel desulfurization according to the above embodiment is supplied from the outside of a reactor (a variety of furnaces and the like), and is, for example, powder or lump; however, in the molten steel desulfurization method according to the present embodiment, slag may be formed on the surface of molten steel so that the composition becomes the same as the composition of the flux.

On the surface of molten steel before initiation of desulfurization, there are cases in which slag generated in the prior process (residual slag) is somewhat present. In this case, since a desulfurization reaction proceeds in a state in which a desulfurization flux supplied from the outside of the reactor and the residual slag are mixed, the composition of the slag (slag during desulfurization) on the molten steel may be in a state in which the desulfurization flux supplied from the outside of the reactor and the existing slag are mixed.

Furthermore, the composition of the slag during desulfurization does not only mean the composition of the slag on the molten steel immediately after initiation of desulfurization.

Since $Na_2O$, $K_2O$, and $Li_2O$ easily evaporate, the composition of the slag on the molten steel immediately after initiation of desulfurization need not satisfy the composition of the environmentally friendly flux for molten steel desulfurization of the embodiment. That is, in addition to the fact that the composition of the residual slag is basically different from the composition of the environmentally friendly flux for molten steel desulfurization of the embodiment, $R_2O$ ($Na_2O$, $K_2O$, and $Li_2O$) evaporate in a process in which a desulfurization reaction proceeds, and the composition of desulfurization slag present on the surface of the molten steel may satisfy the composition of the environmentally friendly flux for molten steel desulfurization of the embodiment.

When the rate of the desulfurization reaction is taken into account, the composition of the slag present on the surface of the molten steel may satisfy the composition of the environmentally friendly flux for molten steel desulfurization of the embodiment until at least the first half (at a point in time at the half of the desulfurization treatment time) of the desulfurization treatment time. In this case, the second half of the desulfurization time can be effectively used for the desulfurization reaction, and a more favorable desulfurization effect can be obtained compared to a case in which the slag on the surface of the molten steel is adjusted in the second half of the desulfurization treatment time.

In the molten steel desulfurization method according to the second embodiment, when a desulfurization flux comes into contact with molten steel, the composition may be adjusted so as to become the composition of the environmentally friendly flux for molten steel desulfurization flux of the embodiment. For example, instead of mixing some of the components of a desulfurization flux and other components, some of the components and other components may be separately added (supplied) using, for example, different supply mechanisms or supply apparatuses. That is, as long as the composition is adjusted to the composition of the environmentally friendly flux for molten steel desulfurization of the embodiment on the molten steel, the addition method (supply method) is not limited to a specific method.

Therefore, in the molten steel desulfurization method according to the second embodiment, slag including one or more alkali metal oxides of $Na_2O$, $K_2O$, and $Li_2O$, CaO, $Al_2O_3$, and $SiO_2$ wherein $[CaO]/[Al_2O_3]$ is within a range of 1.6 to 3.0, $[SiO_2]/[R_2O]$ is within a range of 0.1 to 3, $[R_2O]$ is within a range of 0.5 mass % to 5 mass %, and $[SiO_2]$ is within a range of 0.05 mass % to 15 mass %, is formed on the surface of molten steel. Meanwhile, a desulfurization flux in which some or all of $R_2O$ has a chemical bond with $SiO_2$ may be used. Here, since the composition of the slag formed on the surface of the molten steel is the same as the composition of the environmentally friendly flux for molten steel desulfurization of the above-mentioned embodiment, the amounts of each component will not be described here.

Meanwhile, evaporation of $R_2O$ can be suppressed more in the molten steel desulfurization method according to the first embodiment than in the molten steel desulfurization method according to the second embodiment.

EXAMPLES

Next, examples of the present invention will be described, but the conditions in the examples are simply an example of conditions employed to confirm the feasibility and effects of the present invention, and the present invention is not limited to the example of conditions. The present invention can employ a variety of conditions within the scope of the purport of the present invention as long as the objective of the present invention can be achieved.

Example

Molten steel prepared using a 400 t-capacity converter was desulfurized in an RH vacuum degasser. After desulfurization, a sample was taken from the molten steel, and the S content in the sample (molten steel) was analyzed. The chemical compositions of the molten steels used in the actual tests are shown in Table 2. The conditions in the actual tests are as follows.

Desulfurization process: RH vacuum degasser, ladle capacity: 400 t, molten steel temperature: 1620° C.

Desulfurization method: blowing of powder into the molten steel using an injection lance or onto the surface of the molten steel using a lance Desulfurization time: 35 minutes Specific consumption of flux (per ton of molten steel): 3.5 kg/t

TABLE 2

| | | | | | | | | | (mass %) |
|---|---|---|---|---|---|---|---|---|---|
| STEEL GRADE | C | Si | Mn | P | Al | Ti | Nb | N | O |
| A | 0.05 | 0.2 | 1.0 | 0.005 | 0.03 | 0.05 | 0.02 | 0.003 | 0.0015 |
| B | 0.08 | 0.8 | 1.5 | 0.004 | 0.04 | 0.13 | 0.04 | 0.0035 | 0.0020 |
| C | 0.16 | 1.0 | 1.3 | 0.003 | 0.035 | 0.15 | 0.08 | 0.003 | 0.0022 |

The condition Nos. of the actual tests are shown in Table 3.

TABLE 3

| NO. | STEEL GRADE | COMPOSITION OF DESULFURIZATION FLUX (mass %) | | | | | | | [CaO]/[Al₂O₃] (—) | [SiO₂]/([Na₂O]+[K₂O]+[Li₂O]) (—) | Note |
|---|---|---|---|---|---|---|---|---|---|---|---|
| | | [CaO] | [SiO₂] | [Al₂O₃] | [Na₂O] | [K₂O] | [Li₂O] | [MgO] | | | |
| 1 | A | 61 | 0.4 | 38.1 | 0.5 | 0 | 0 | 0 | 1.6 | 0.8 | MIXED POWDER |
| 2 | B | 59 | 0.3 | 34.7 | 0 | 1.0 | 0 | 5.0 | 1.7 | 0.3 | PARTIALLY-FUSED PRODUCT |
| 3 | C | 62 | 3.6 | 34.4 | 0 | 0 | 2.0 | 0 | 1.8 | 1.8 | PARTIALLY-FUSED PRODUCT |
| 4 | A | 62 | 4.0 | 31.0 | 2.0 | 0 | 0 | 1.0 | 2.0 | 2.0 | USE OF SODA-LIME GLASS |
| 5 | B | 66 | 0.5 | 30.0 | 0 | 3.5 | 0 | 0 | 2.2 | 0.1 | MIXED POWDER |
| 6 | C | 60 | 15.0 | 25.0 | 0 | 0 | 5.0 | 0 | 2.4 | 3.0 | MIXED POWDER |
| 7 | A | 62 | 1.2 | 25.8 | 0.5 | 0.5 | 0 | 10.0 | 2.4 | 1.2 | PARTIALLY-FUSED PRODUCT |
| 8 | B | 64 | 9.4 | 24.6 | 0 | 2.0 | 2.0 | 0 | 2.6 | 2.3 | MIXED POWDER |
| 9 | C | 66 | 7.4 | 23.6 | 2.0 | 1.0 | 1.0 | 0 | 2.8 | 1.9 | MIXED POWDER |
| 10 | A | 60 | 10.0 | 20.0 | 3.0 | 0 | 2.0 | 7.0 | 3.0 | 2.0 | USE OF GLASS CULLET |
| 11 | B | 56 | 2.0 | 35.0 | 7.0 | 0 | 0 | 0 | 1.6 | 0.3 | MIXED POWDER |
| 12 | C | 52 | 16.0 | 26.0 | 0 | 6.0 | 0 | 0 | 2.0 | 2.7 | PARTIALLY-FUSED PRODUCT |
| 13 | A | 55 | 22.1 | 22.9 | 0 | 0 | 8.0 | 0 | 2.4 | 2.8 | PARTIALLY-FUSED PRODUCT |
| 14 | B | 55 | 4.1 | 37.9 | 3.0 | 0 | 0 | 0 | 1.45 | 1.4 | USE OF SODA-LIME GLASS |
| 15 | C | 63 | 5.4 | 30.0 | 0 | 1.65 | 0 | 0 | 2.1 | 3.3 | PARTIALLY-FUSED PRODUCT |
| 16 | A | 63 | 0.8 | 26.3 | 0.2 | 0.1 | 0 | 0 | 2.4 | 2.7 | MIXED POWDER |
| 17 | B | 59 | 14.9 | 21.1 | 3.0 | 2.0 | 2.0 | 0 | 2.8 | 2.1 | USE OF GLASS CULLET |
| 18 | C | 55 | 0 | 32.4 | 2.0 | 0 | 3.0 | 12.0 | 1.7 | 0 | MIXED POWDER |
| 19 | A | 53 | 16.5 | 26.5 | 0 | 4.0 | 0 | 0 | 2.0 | 4.1 | MIXED POWDER |
| 20 | B | 71 | 4.8 | 22.2 | 2.0 | 0 | 0 | 0 | 3.2 | 2.4 | MIXED POWDER |
| 21 | C | 64 | 4.0 | 32.0 | 0 | 0 | 0 | 0 | 2.0 | — | MIXED POWDER |
| 22 | A | 60 | 40CaF₂ | | | | | | — | — | PARTIALLY-SINTERED PRODUCT |

The note column in Table 3 will be described as follows.

MIXED POWDER: a flux of a powder mixture of the oxides

PARTIALLY-FUSED PRODUCT: a flux obtained by melting, cooling, and crushing a powder mixture of R₂O and SiO₂ in advance, and then mixing the obtained pre-melted powder with powder of other components PARTIALLY-SINTERED PRODUCT: a flux obtained by sintering, cooling, and crushing a powder mixture of R₂O and SiO₂ in advance, and then mixing the obtained sintered powder with powder of other components USE OF SODA-LIME GLASS: a flux obtained by crushing soda-lime glass and mixing the obtained glass powder with powder of the oxides USE OF GLASS CULLET: a flux obtained by crushing glass cullet and mixing the obtained glass powder with powder of the oxides The results of the actual tests are shown in Table 4. The desulfurization ratio is defined to be ((the S content before desulfurization−the S content after desulfurization)/the S content before desulfurization)×100.

TABLE 4

| NO. | INITIAL S CONTENT (ppm) | FINAL S CONTENT (ppm) | DESULFURIZATION RATIO (%) | NOTE |
|---|---|---|---|---|
| 1 | 47 | 8 | 83 | EXAMPLE |
| 2 | 40 | 6 | 85 | EXAMPLE |
| 3 | 44 | 7 | 84 | EXAMPLE |
| 4 | 36 | 5 | 86 | EXAMPLE |
| 5 | 50 | 8 | 84 | EXAMPLE |
| 6 | 42 | 7 | 83 | EXAMPLE |
| 7 | 36 | 6 | 83 | EXAMPLE |
| 8 | 38 | 7 | 82 | EXAMPLE |
| 9 | 44 | 8 | 82 | EXAMPLE |
| 10 | 49 | 9 | 82 | EXAMPLE |
| 11 | 50 | 12 | 76 | COMPARATIVE EXAMPLE |
| 12 | 48 | 11 | 77 | COMPARATIVE EXAMPLE |
| 13 | 44 | 11 | 75 | COMPARATIVE EXAMPLE |
| 14 | 50 | 11 | 78 | COMPARATIVE EXAMPLE |
| 15 | 53 | 14 | 74 | COMPARATIVE EXAMPLE |
| 16 | 50 | 15 | 70 | COMPARATIVE EXAMPLE |
| 17 | 45 | 13 | 71 | COMPARATIVE EXAMPLE |
| 18 | 52 | 14 | 73 | COMPARATIVE EXAMPLE |
| 19 | 50 | 15 | 70 | COMPARATIVE EXAMPLE |
| 20 | 52 | 13 | 75 | COMPARATIVE EXAMPLE |
| 21 | 50 | 17 | 66 | COMPARATIVE EXAMPLE |
| 22 | 40 | 8 | 80 | COMPARATIVE EXAMPLE |

TABLE 5

|  | [CaO] | [SiO$_2$] | [Al$_2$O$_3$] | [MnO] | [MgO] | [P$_2$O$_5$] | [Na$_2$O] | [FeO] | (mass %) [Fe$_2$O$_3$] |
|---|---|---|---|---|---|---|---|---|---|
| SODA-LIME GLASS | 9.5 | 75 | — | — | — | — | 15.5 | — | — |
| GLASS CULLET | 0.2 | 64 | 0.6 | — | 0.2 | — | 35 | — | — |
| CONVERTER SLAG | 48 | 14 | 1.6 | 4.3 | 7.1 | 3 | 0 | 12 | 10 |

Nos. 1 to 10 are examples that satisfy the conditions of the present invention. In the examples, the S content is sufficiently decreased, and a high desulfurization ratio of 82% or more is obtained. In addition, Na-based compounds, K-based compounds, and Li-based compounds are not attached to the inside of the exhaust duct, and [Na$_2$O], [K$_2$O], and [Li$_2$O] in slag were 2 mass % or less after desulfurization. Therefore, under the conditions of Nos. 1 to 10, Na$_2$O, K$_2$O, and Li$_2$O (R$_2$O) can be efficiently used, and the obtained slag can be sufficiently used for a variety of uses.

Meanwhile, in Nos. 6, 8, and 10, since the existing slag is mixed in the desulfurization flux, the composition of the desulfurization flux is a composition after mixing of the slag. In addition, in No. 10, the composition of the slag during desulfurization reaches a composition shown in Table 3 when the desulfurization reaction process proceeds, and the composition of the slag is a composition of the second half of the desulfurization (20 minutes/35 minutes of the desulfurization treatment time). Additionally, in No. 10, even in a case in which a flux having a composition shown in Table 3 was used, the same desulfurization ratio (84%) was obtained.

Here, the chemical compositions of soda-lime glass used in Nos. 4 and 14, slag (converter slag) used in Nos. 6, 8, and 10, and glass cullet used in Nos. 10 and 17 are shown in Table 5.

Nos. 11 to 22 are comparative examples that do not satisfy the conditions of the present invention. Among the comparative examples, the maximum desulfurization ratio was 80% which was obtained in No. 22 in which CaF$_2$ was used, and the desulfurization ratio was as low as 68% to 78% in other Nos.

The amount of Na$_2$O was excessive in No. 11, the amount of K$_2$O was excessive in No. 12, and the amount of Li$_2$O was excessive in No. 13. Therefore, in Nos. 11 to 13, the desulfurization ratios were low, and the amounts of R$_2$O attached to the facility due to evaporation were large. In addition, large amounts of Na$_2$O, K$_2$O, and Li$_2$O were included in slag after desulfurization, and recycling of the slag was not possible.

Since the content ratio [CaO]/[Al$_2$O$_3$] is too low in No 14, and the content ratio [SiO$_2$]/[K$_2$O] is too high in No. 15, the desulfurization ratios were low in Nos. 14 and 15. Since the total amount of Na$_2$O and K$_2$O is small in No. 16, and the total amount of Na$_2$O, K$_2$O, and Li$_2$O is too large in No. 17, the target desulfurization ratio of 82% or more was not achieved in Nos. 16 and 17.

The amount of MgO was large, and the amount of SiO$_2$ was small in No. 18, the amount of SiO$_2$ was large in No. 19, and the content ratio [CaO]/[Al$_2$O$_3$] was too high in No. 20. Therefore, the target desulfurization ratio of 82% or more was not achieved in Nos. 18 to 20. In addition, in No. 21, since the flux did not include any of Na$_2$O, K$_2$O, and Li$_2$O, the target desulfurization ratio of 82% or more was not achieved.

In No. 22, since the flux contained CaF$_2$, a relatively high desulfurization ratio was obtained compared to other comparative examples, but the desulfurization ratio failed to exceed 82%. Furthermore, in No. 22, the obtained slag had a high content of F, and could not be recycled.

INDUSTRIAL APPLICABILITY

As described above, according to the present invention, it is possible to manufacture high-grade steel having an extremely small amount of S without occurrence of problems of elution of F from slag after desulfurization, attachment of Na$_2$O or K$_2$O to a facility due to evaporation, a decrease in productivity due to a decrease in desulfurization efficiency, an increase in desulfurization costs, and the adverse influence of slag including a large amount of Na$_2$O or K$_2$O after desulfurization on the environment. Therefore, the present invention is highly available in steel-making techniques of steel industry.

What is claimed is:

1. An environmentally friendly flux for molten steel desulfurization comprising:
   CaO and Al$_2$O$_3$ so that [CaO] is 61 to 75 mass % and [CaO]/[Al$_2$O$_3$] is within a range of 1.6 to 3.0; and one or more alkali metal oxides of Na$_2$O, K$_2$O, and Li$_2$O, and SiO$_2$ so that [SiO$_2$]/[R$_2$O] is within a range of 0.1 to 3, [R$_2$O] is within a range of 0.5 mass % to 5 mass %, and [SiO$_2$] is within a range of 0.05 mass % to 15 mass %, in a case in which the [CaO], the [Al$_2$O$_3$], the [SiO$_2$], and the [R$_2$O] represent mass % of CaO, mass % of Al$_2$O$_3$, mass % of SiO$_2$, and a total amount of mass % of Na$_2$O, mass % of K$_2$O, and mass % of Li$_2$O respectively.

2. The environmentally friendly flux for molten steel desulfurization according to claim 1, further comprising 1 mass % to 10 mass % of MgO.

3. The environmentally friendly flux for molten steel desulfurization according to claim 1 or 2, wherein the [SiO$_2$] is 0.05 mass % to 9.3 mass %.

4. The environmentally friendly flux for molten steel desulfurization according to claim 1 or 2, wherein the [SiO$_2$] is 0.05 mass % to 8.0 mass %.

5. The environmentally friendly flux for molten steel desulfurization according to claim 1 or 2, wherein the [SiO$_2$]/[R$_2$O] is 0.1 to 2.

6. The environmentally friendly flux for molten steel desulfurization according to claim 1 or 2, wherein some or all of the alkali metal oxides have a chemical bond with the SiO$_2$.

7. The environmentally friendly flux for molten steel desulfurization according to claim 1 or 2, wherein the alkali metal oxides are Na$_2$O.

8. A molten steel desulfurization method comprising supplying the environmentally friendly flux for molten steel desulfurization according to claim 1 or 2 to a molten steel.

9. A molten steel desulfurization method comprising forming a slag on a surface of a molten steel, the slag including one or more of Na$_2$O, K$_2$O, and Li$_2$O, as well as CaO, Al$_2$O$_3$, and SiO$_2$ so that [CaO] is 61 to 75 mass %, and [CaO]/[Al$_2$O$_3$] is within a range of 1.6 to 3.0, [SiO$_2$]/[R$_2$O] is within a range of 0.1 to 3, [R$_2$O] is within a range of 0.5 mass % to 5 mass %, and [SiO$_2$] is within a range of 0.05 mass % to 15 mass %, in a case in which the [CaO], the [Al$_2$O$_3$], the [SiO$_2$], and the [R$_2$O] represent mass % of CaO, mass % of Al$_2$O$_3$, mass % of SiO$_2$, and a total amount of mass % of Na$_2$O, mass % of K$_2$O, and mass % of Li$_2$O respectively.

* * * * *